(12) United States Patent
Popp et al.

(10) Patent No.: US 9,191,381 B1
(45) Date of Patent: Nov. 17, 2015

(54) STRONG AUTHENTICATION VIA A FEDERATED IDENTITY PROTOCOL

(75) Inventors: Nicolas Popp, Menlo Park, CA (US); Alan Dundas, Los Altos Hills, CA (US); Siddharth Bajaj, San Francisco, CA (US); Mingliang Pei, Palo Alto, CA (US); Liyu Yi, Fremont, CA (US); John Smith, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 61 days.

(21) Appl. No.: 13/218,301

(22) Filed: Aug. 25, 2011

(51) Int. Cl.
*G06F 21/31* (2013.01)
*H04L 29/06* (2006.01)

(52) U.S. Cl.
CPC ............ *H04L 63/08* (2013.01); *H04L 63/0815* (2013.01); *H04L 63/0853* (2013.01)

(58) Field of Classification Search
CPC ... H04L 63/083; H04L 63/08; H04L 63/0815; H04L 63/102; G06F 21/31; G06F 21/41
USPC ......... 705/67; 713/155, 176, 185; 726/1, 2, 4, 726/5, 6, 9, 10
See application file for complete search history.

(56) References Cited

U.S. PATENT DOCUMENTS

| | | | |
|---|---|---|---|
| 2006/0129816 A1* | 6/2006 | Hinton ........................ | 713/169 |
| 2007/0130463 A1* | 6/2007 | Law et al. ................... | 713/168 |
| 2007/0234408 A1* | 10/2007 | Burch et al. ................ | 726/6 |
| 2008/0015986 A1* | 1/2008 | Wright ......................... | 705/44 |
| 2008/0028453 A1* | 1/2008 | Nguyen et al. .............. | 726/9 |
| 2008/0046984 A1* | 2/2008 | Bohmer et al. .............. | 726/5 |
| 2008/0127320 A1* | 5/2008 | De Lutiis et al. ........... | 726/9 |
| 2010/0318806 A1* | 12/2010 | Hardt .......................... | 713/176 |
| 2011/0016320 A1* | 1/2011 | Bergsten et al. ............ | 713/170 |

* cited by examiner

*Primary Examiner* — Andrew Nalven
*Assistant Examiner* — Huan V Doan
(74) *Attorney, Agent, or Firm* — Lowenstein Sandler LLP (57) ABSTRACT

A computing system of an authentication service provider receives a federated identity protocol request triggered by a relying party to validate a user. The federated identity protocol request includes a user identifier of an authenticated identity. The computing system searches mapping data stored in a data store that is coupled to the computing system to identify a type of virtual token associated with the user identifier and authenticates the user by requesting the identified type of virtual token from a user device and verifying a virtual token received from the user device using the mapping data. The computing system sends second-factor authentication results to the relying party via the federated identity protocol.

17 Claims, 9 Drawing Sheets

STRONG AUTHENTICATION VIA A FEDERATED IDENTITY PROTOCOL

TECHNICAL FIELD

Embodiments of the present invention relate to strong authentication. Specifically, the embodiments of the present invention relate to providing strong authentication via a federated identity protocol.

BACKGROUND

Enterprises can control user access to enterprise applications, such as web applications, by authenticating users via user credentials, such as a username and password. Enterprises may wish to provide a more secure environment by implementing strong authentication, also known as second-factor authentication. Second-factor authentication requires a user to provide additional evidence of who they are, for example, via a one-time password (OTP), a digital certificate (e.g., public key infrastructure (PKI) certificate), a fingerprint, etc.

Traditionally, enterprises develop proprietary application programming interfaces (APIs) to integrate a strong authentication service provider into an existing application infrastructure. In addition, enterprises must modify existing front-end application user interfaces and back-end database schemas to support second-factor authentication. For example, for an enterprise that wishes to integrate second-factor authentication via digital certificates into an existing architecture, the enterprise must change an existing database schema and add application logic to determine whether users have PKI certificates, verify the PKI certificates, provision PKI certificates, etc. Such a change to existing enterprise architecture is often time-consuming and may require additional development resources and add overhead to the enterprise application.

SUMMARY

In one embodiment, a system for providing strong authentication via a federated identity protocol is described. An exemplary system may include a memory and a processor that is coupled to the memory. In one embodiment, the system receives a federated identity protocol request triggered by a relying party to validate a user using second-factor authentication. The federated identity protocol request includes a user identifier of an authenticated identity. The system searches mapping data stored in a data store that is coupled to the system to identify a type of virtual token associated with the user identifier. The system authenticates the user by requesting the identified type of virtual token from a user device and verifying a virtual token received from the user device using the mapping data. The system sends second-factor authentication results to the relying party via the federated identity protocol.

In one embodiment, the system authenticates the user by requesting the identified type of virtual token without notifying the user of the request for the identified type of virtual token and receiving a virtual token from the user device without receiving user input via the user device. In one embodiment, the system sends a request for the identified type of virtual token to a plug-in hosted by a user device. The plug-in obtains a virtual token hosted by the user device in response to the request.

In one embodiment, the identified type of virtual token is a public key infrastructure certificate. In one embodiment, the federated identity protocol is Security Assertion Markup Language.

In one embodiment, the system further includes a second memory and a second processor that is coupled to the second memory. In one embodiment, the second processor receives first-factor validation results indicating that a user identity of a user is authenticated from an application server and sends a federated identity protocol request that includes a user identifier of the user identity that is authenticated to an authentication service provider. The federated identity protocol request is a request for the authentication service provider to validate the user using second-factor authentication. The second processor receives a request for a type of a virtual token from the authentication service provider and provides a virtual token from a local data store to the authentication service provider. The authentication service provider generates second-factor authentication results indicating whether the provided virtual token is valid. The system provides the second-factor authentication results to the application server.

In one embodiment, the system further includes a plug-in to receive the request from the authentication service provider and locate the virtual token in a local data store. In one embodiment, the user identifier does not reveal a first-factor credential of the user.

In addition, a non-transitory computer readable storage medium for providing strong authentication via a federated identity protocol is described. An exemplary non-transitory computer readable storage medium includes instructions that will cause a processor to receive a federated identity protocol request, which includes a user identifier of an authenticated identity, triggered by a relying party to validate a user using second-factor authentication, search mapping data stored in a data store that is coupled to the computing system to identify a type of virtual token associated with the user identifier, authenticate the user by requesting the identified type of virtual token from a user device and verifying a virtual token received from the user device using the mapping data, and send second-factor authentication results to the relying party via the federated identity protocol.

Further, a method for providing strong authentication via a federated identity protocol is described. In one embodiment, a method comprises receiving, by the computing system of the authentication service provider, a federated identity protocol request triggered by a relying party to validate a user using second-factor authentication, the federated identity protocol request including a user identifier of an authenticated identity, searching mapping data stored in a data store that is coupled to the computing system to identify a type of virtual token associated with the user identifier, authenticating the user by requesting the identified type of virtual token from a user device and verifying a virtual token received from the user device using the mapping data, and sending second-factor authentication results to the relying party via the federated identity protocol.

Further, a method for providing silent strong authentication services via a federated identity protocol is described. In one embodiment, a method comprises receiving first-factor validation results indicating that a user identity of a user is authenticated from an application server, sending a federated identity protocol request comprising a user identifier of the user identity that is authenticated to an authentication service provider, the federated identity protocol request being a request for the authentication service provider to validate the user using second-factor authentication, receiving a request for a type of a virtual token from the authentication service provider, providing a virtual token from a local data store to the authentication service provider, wherein the authentication service provider generates second-factor authentication results indicating whether the provided virtual token is valid, and providing the second-factor authentication results to the application server.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 6 is a block diagram of one embodiment of a silent second-factor authentication plug-in.

DETAILED DESCRIPTION

Embodiments of the invention are directed to a method and system for providing strong authentication via a federated identity protocol. A computing system of an authentication service provider receives a federated identity protocol request triggered by a relying party to validate a user. The federated identity protocol request includes a user identifier of an authenticated identity. The computing system searches mapping data stored in a data store that is coupled to the computing system to identify a type of virtual token associated with the user identifier and authenticates the user by requesting the identified type of virtual token from a user device and verifying a virtual token received from the user device using the mapping data. The computing system sends second-factor authentication results to the relying party via the federated identity protocol.

Embodiments of the invention provide an enterprise a simple and convenient mechanism to integrate strong authentication into existing application authentication architectures. Embodiments eliminate the need for an enterprise to develop proprietary application programming interface (API) calls to an authentication server provider and remove the need to change an existing enterprise database schema to support strong authentication. Embodiments also provide diverse credential support and silent authentication using a single strong authentication service provider.

Figure 1A:
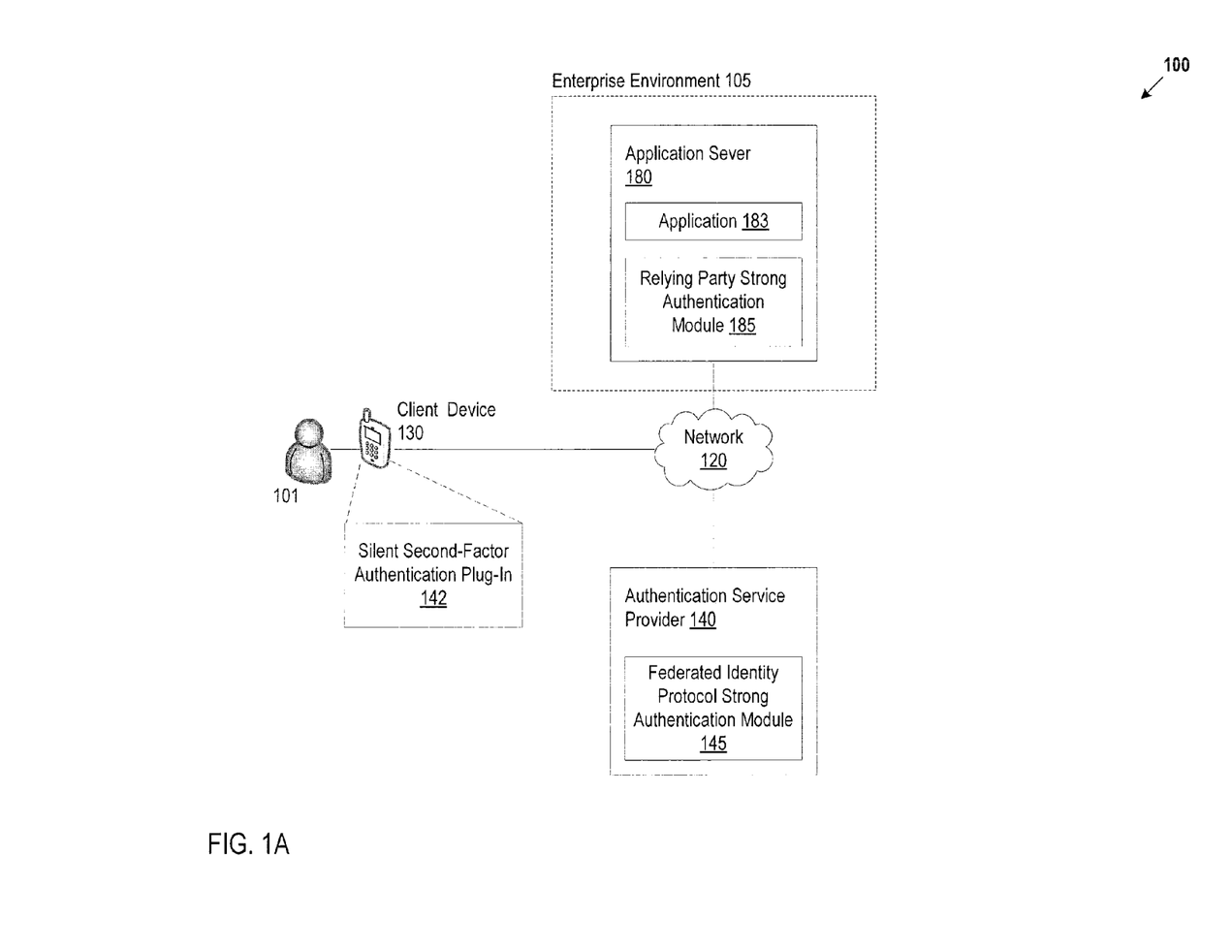
FIGS. 1A-B are embodiments of a network architecture in which embodiments of the present invention may operate.

FIG. 1A is one embodiment of a network architecture 100 in which embodiments of the present invention can be implemented. The network architecture 100 can include an enterprise environment 105 including one or more application servers 180 hosting one or more applications 183. Users 101 can access an application 183 using a client device 130 via a network 120. A client device is hereinafter also referred to as a user device. The network 120 can be a local area network (LAN), a wireless network, a mobile communications network, a wide area network (WAN), such as the Internet, or similar communication system. The network 120 can include any number of networking and computing devices such as wired and wireless devices.

An application server 180 can be hosted by any type of computing device including server computers, gateway computers, desktop computers, laptop computers, hand-held computers or similar computing device. A client device 130 can be hosted by any type of computing device including desktop computers, laptop computers, tablet computers, mobile communications devices, cell phones, smart phones, hand-held computers, or similar computing device.

A user 101 can login to an application 183 via a client device 130 and using first-factor credentials, such as a user ID (identifier) and password. An application 183 can represent one or more applications of any type including, for example, a web application, a desktop application, a SSL VPN gateway or any network-based, software-based service, etc. A client device 130 can host a web browser, or similar application, to access an application 183.

A user 101 can register a client device 130 with an authentication service provider 140. The registration process can install a silent second-factor authentication plug-in 142 and a second-factor credential on the client device 130. In one embodiment, the second-factor credential is a virtual token. A virtual token is a credential that is not visible to a browser, such as a browser hosted by the client device 130. In one embodiment, the virtual token is a digital certificate. A digital certificate can be a Public Key Infrastructure (PKI) certificate that is issued by a certificate authority. The digital certificate can be a X.509 digital certificate.

The application server 180 can include a relying party strong authentication module 185 to integrate strong authentication into the enterprise environment 105 via a federated identity protocol. The relying party strong authentication module 185 can communicate with the silent second-factor authentication plug-in 142, which in turn, can communicate with an authentication service provider 140 via a federated identity protocol to integrate strong authentication into the enterprise environment 105. In one embodiment, the authentication service provider 140 can be implemented as a cloud service provider to provide strong authentication solutions to one or more enterprise environments 105 using a cloud computing and SaaS (software as a service).

The silent second-factor authentication plug-in 142 can integrate silent second-factor authentication into the enterprise environment 105. Silent second-factor authentication does not involve user input by a user 101 and can be performed without notifying a user 101 that second-factor authentication is being used. With silent second-factor authentication, a user 101 can login to an enterprise application 183 using first-factor credentials without noticing that second-factor authentication is also being performed.

A federated identity protocol can provide a framework for exchanging security information. Examples of a federated identity protocol can include, and are not limited to, Security Assertion Markup Language (SAML) and OpenID. Strong authentication is hereinafter also referred to as second-factor authentication. Examples of strong authentication can include, and are not limited to, one-time password (OTP), digital certificates (e.g., public key infrastructure (PKI) certificates), device fingerprinting, physical tokens, etc.

When an identity of a user 101 has been authenticated, for example, using a first-factor username and password, the relying party strong authentication module 185 can trigger the silent second-factor authentication plug-in 142 to send a request via a federated identity protocol to the authentication service provider 140 to validate a user 101 and/or client device 130 using second-factor authentication. In one embodiment, the application server 180 is a relying party, which is the party triggering a request to the authentication service provider 140 to validate a user 101 and/or client device 130. Another embodiment describing a primary identity service provider as a relying party to trigger a request to the authentication service provider 140 is described in greater detail below in conjunction with FIG. 1B.

The authentication service provider 140 can include a federated identity protocol strong authentication module 145 to receive the request o validate the user 101 and/or user device 130 using second-factor authentication. The federated identity protocol strong authentication module 145 can exchange communications with the silent second-factor authentication plug-in 142 to validate the user 101 and/or client device 130. Embodiments of using the silent second-factor authentication plug-in 142 to validate the user 101 and/or client device 130 are described in greater detail below in conjunction with FIGS. 3-5.

The federated identity protocol strong authentication module 145 can generate and send second-factor authentication results to the silent second-factor authentication plug-in 142, which can then forward the results to the application server 180 via a federated identity protocol. The application server 180 can determine whether to grant a user 101 access to an application 183 based on the received second-factor authentication results.

The communication between the relying party strong authentication module 185, the silent second-factor authentication plug-in 142, and the federated identity protocol module 185 via a federated identity protocol removes the need of the enterprise environment 105 to develop additional application plug-ins, web service calls, and/or APIs to communicate with the authentication service provider 140 to integrate strong authentication, and thus, keeps any application overhead to a minimum.

In a typical federated identity protocol request, a user identifier is not included in the request. Embodiments modify a federated identity protocol request to include a user identifier, which corresponds to a user identity that has been authenticated. Embodiments also provide the enterprise environment 105 with diverse second-factor credential support. For example, enterprises can easily integrate second-factor PKI certification and second-factor OTP with existing enterprise first-factor authentication architectures without requiring an enterprise to modify its database schema. Embodiments also provide anonymous second-factor authentication. Anonymous second-factor authentication authenticates a user 101 and/or client device 130 without exposing any user first-factor authentication credentials, such as a username, across the network 120.

Figure 1B:
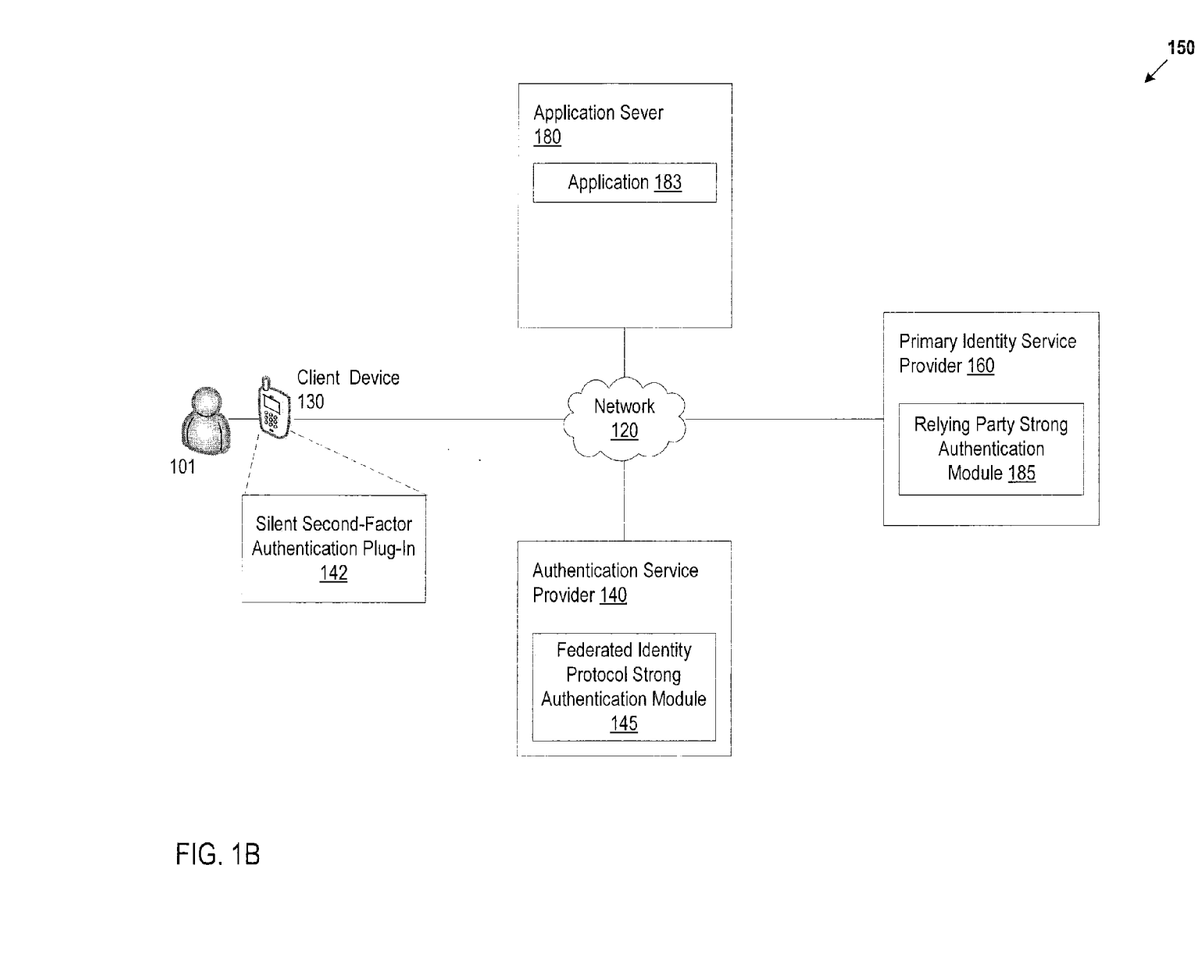

FIG. 1B is another embodiment of a network architecture 150 in which embodiments of the present invention can be implemented. The network architecture 150 can include a primary identity service provider 160 communicating with one or more enterprise application servers 180 hosting one or more applications 183, an authentication service provider 140, and one or more users 101 via network 120.

A user 101 can login to an application 183 via a client device 130 using first-factor credentials. The application server 180 can provide the first-factor credentials of the user 101 to the primary identity service provider 160, which can then validate the first-factor credentials. A primary identity service provider 160 can be hosted by any type of computing device including server computers, gateway computers, desktop computers, laptop computers, hand-held computers or similar computing device.

An enterprise may wish to further authenticate the user 101 and/or client device 130 using second-factor authentication, and the primary identity service provider 160 can be configured as a relying party to trigger a request to be sent to the authentication service provider 140 to validate a user 101 and/or client device 130 using strong authentication. The primary identity service provider 160 can include a relying party strong authentication module 185 to trigger the silent second-factor authentication plug-in 142 to send a request via a federated identity protocol to the authentication service provider 140 to validate a user 101 and/or client device 130 using second-factor authentication.

The authentication service provider 140 can exchange communications with the silent second-factor authentication plug-in 142 to validate the user 101 and/or client device 130. The federated identity protocol strong authentication module 145 can generate and send second-factor authentication results to the silent second-factor authentication plug-in 142, which can then forward the results to the primary identity service provider 160 via a federated identity protocol. The primary identity service provider 160 can send the second-factor authentication results to the application server 180, which can then determine whether to grant a user 101 access to an application 183 based on the received second-factor authentication results.

Figure 2:
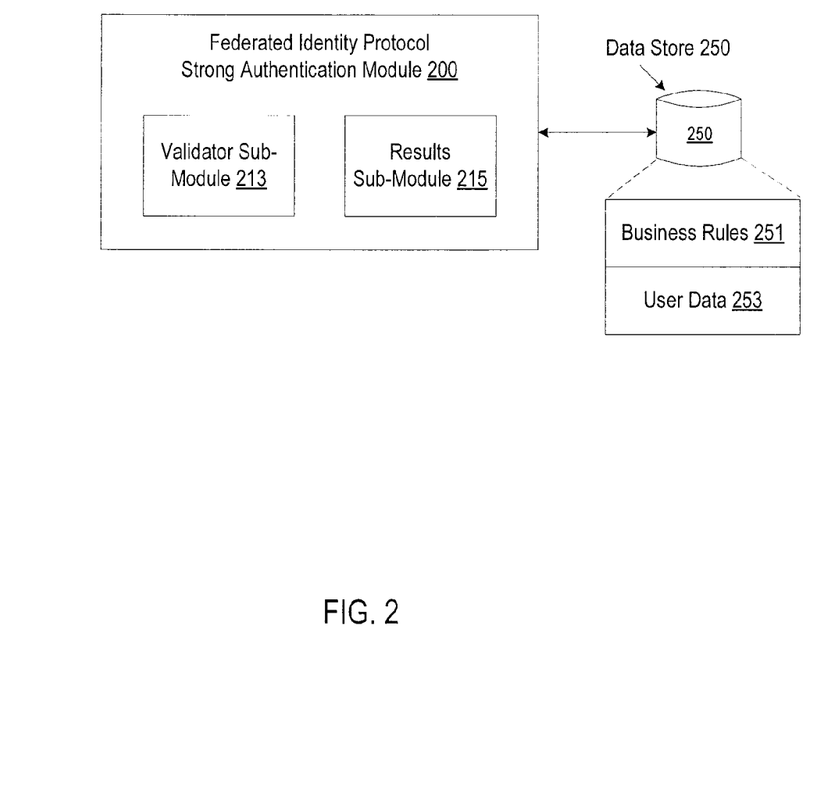
FIG. 2 is a block diagram of one embodiment of a federated identity protocol strong authentication module.

FIG. 2 is a block diagram of one embodiment of a federated identity protocol strong authentication module 200. The federated identity protocol strong authentication module 200 may be the same as the federated identity protocol strong authentication module 145 in FIGS. 1A-B. The federated identity protocol strong authentication module 200 includes a validator sub-module 213 and a results sub-module 215. The sub-modules can be combined together or separated in further sub-modules, according to a particular embodiment.

The validator sub-module 213 can receive a federated identity protocol request from a silent second-factor authentication plug-in hosted by a user device to authenticate a user and/or user device using second-factor authentication. A relying party, such as an enterprise application server or a primary identity service provider, can trigger the silent second-factor authentication plug-in to send the request to the request sub-module 210.

The federated identity protocol request can include, for example, a user identifier of an authenticated identity, an enterprise identifier, and one or more attributes, such as a second-factor attribute identifying the type of second-factor authentication challenge which the authentication service provider should use or a specific second-factor authentication challenge that should be used. A second-factor challenge can be a request for a second-factor credential. For example, a second-factor challenge can be a request for a digital certificate.

The validator sub-module 213 can determine whether the federated identity protocol request is a legitimate request by applying the user identifier, enterprise identifier, and/or the attributes from the request to business rules 251 and user data 253 that are stored in a data store 250 that is coupled to the federated identity protocol strong authentication module 200. A legitimate request is a request that satisfies business rules 251.

The user data 253 can be provided by one or more enterprises and can describe data pertaining to a user, such as a user level (e.g., Premium level user, Basic level user), a user role (e.g., administrator role, user role), a user identifier, a hash algorithm associated with the user. The user data 253 can also include second-factor authentication user data, such as mapping data that associates user second-factor challenges (e.g., requests for OTP, PKI certificates, fingerprints, or physical tokens) and corresponding user devices with a user identifier. The user data 253 can be based on registration data when a user registers user devices with second-factor credentials via an authentication service provider.

The business rules 251 can be provided by one or more enterprises and can describe enterprise policies pertaining to second-factor authentication. For example, the data store 250 stores an enterprise policy, such as a PayPal® policy that allows up to five second-factor authentication credentials (e.g., OTP, physical tokens, fingerprints, one or more virtual certificates, such as PKI certificates) per PayPal® user. One embodiment of using business rules and user data is described in greater detail below in conjunction with FIG. 3.

The validator sub-module 213 can determine a request is a legitimate request if the user identifier, enterprise identifier, and/or the attributes from the request satisfy the business rules 251. When a request is a legitimate request, the validator sub-module 213 can validate a user device (e.g., user smart phone, user laptop computer, user tablet, etc.) based on the business rules 251 and user data 253 that includes the mapping data.

The validator sub-module 213 can use the user identifier and second-factor attribute from the request to search the mapping data in the user data 253 to identify the type of second-factor challenge that is associated with a user. The validator sub-module 213 can authenticate the user device by sending the second-factor challenge (e.g., request for a virtual token, OTP, fingerprint, or physical token) to a user device via a federated identity protocol and comparing the second-factor challenge response that is received from the user device to the second-factor credentials (e.g., virtual token, OTP, fingerprint, physical token) in the mapping data that correspond to the user identifier in the request from the relying party. The validator sub-module 213 can send the second-factor challenge to a silent second-factor authentication plug-in on the client device. One embodiment of sending a challenge to and receiving a response from a silent second-factor authentication plug-in to implement silent second-factor authentication is described in greater detail below in conjunction with FIG. 5.

The user data 253 can also include user device registration that associates particular devices with the user and/or user identifier. The validator sub-module 213 can verify the user by comparing the second-factor challenge response that is received from the user device (e.g., virtual token, OTP, fingerprint, physical token) to the device registration data.

The results sub-module 215 can generate a federated identity protocol response to send to the silent second-factor authentication plug-in. The response can be a SAML assertion, which is a statement about a user. The response can include the validation results indicating whether the user device and/or the user have been or have not been successfully validated using second-factor authentication. The results sub-module 215 can send the response to silent second-factor authentication plug-in via a federated identity protocol. The silent second-factor authentication plug-in can forward the results to a relying party via the federated identity protocol.

A data store 250 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 3:
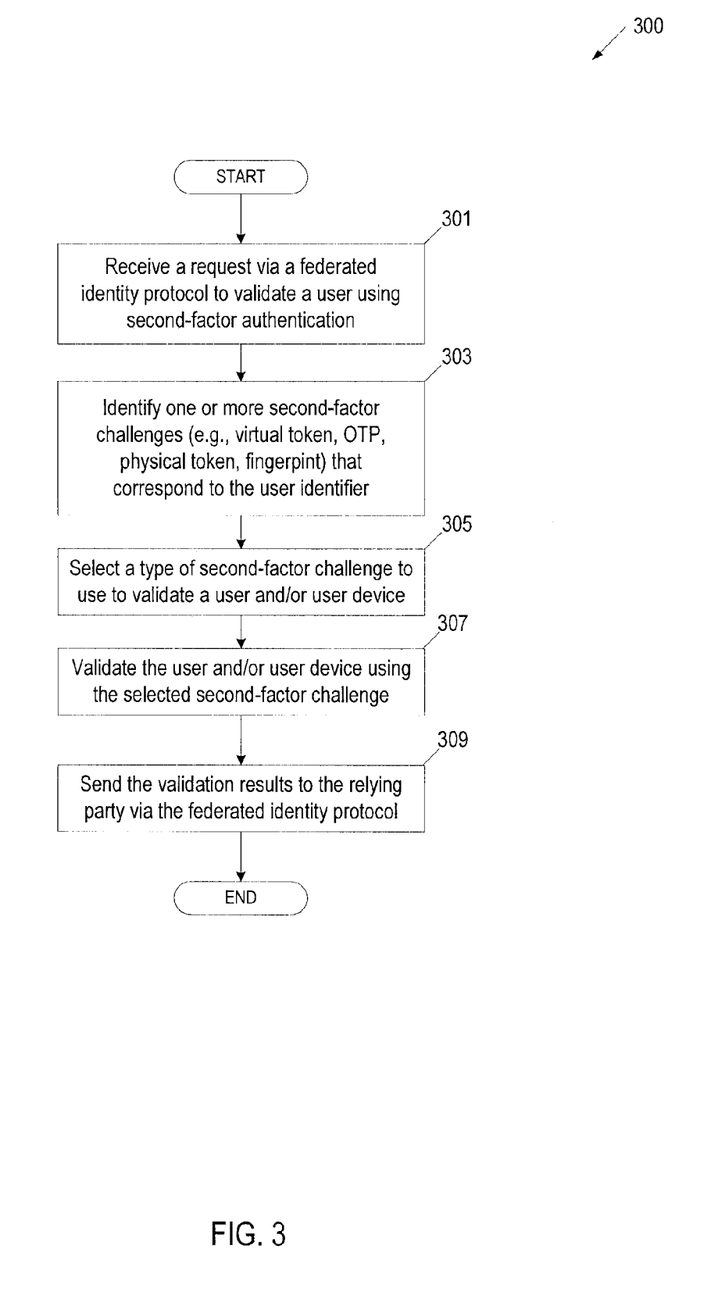
FIG. 3 is a flow diagram of an embodiment of a method for providing strong authentication via a federated identity protocol.

FIG. 3 is a flow diagram of an embodiment of a method 300 for providing strong authentication via a federated identity protocol. Method 300 can be performed by processing logic that can comprise hardware (e.g., circuitry, dedicated logic, programmable logic, microcode, etc.), software (e.g., instructions run on a processing device), or a combination thereof. In one embodiment, method 300 is performed by a federated identity protocol strong authentication module 145 of FIGS. 1A-B.

At block 301, processing logic receives a federated identity protocol request triggered by a relying party via a federated identity protocol to validate a user using second-factor authentication. The trigger can be a successful authentication of a user identity using first-factor authentication. The request includes a user identifier of an authenticated identity. At block 303, processing logic identifies a type of second-factor challenge that corresponds to the user identifier in the data store. Processing logic can use the user identifier from the request to search mapping data stored in a data store for one or more types of second-factor challenges that are associated with the user identifier. The types of second-factor challenges that are associated with the user identifier can include requests for virtual tokens (e.g., PKI certificates).

At block 305, processing logic selects one of the types of second-factor challenges to be used based on a second-factor attribute in the request. For example, the request includes the second-factor attribute TKI_UID1', which is an example indicating that the type of virtual token that should be requested from the client device is the first PKI certificate that is associated with the user identifier. At block 307, processing logic validates the user and/or user device by requesting the identified type of second-factor challenge from a silent second-factor authentication plug-in hosted on a user device and receiving a second-factor challenge response from the plug-in. For example, processing logic queries the plug-in hosted by the user device for a PKI certificate. The second-factor challenge response received from the plug-in can be a virtual token, such as a PKI certificate, that is stored on the user device. Processing logic validates the received virtual token using the mapping data in the data store.

At block 309, processing logic generates and sends a response, which includes validation results indicating whether or not the user device and/or user were successfully validated based on the second-factor response, to the silent second-factor authentication plug-in via a federated identity protocol. The silent second-factor authentication plug-in can forward the validation results to a relying party via a federated identity protocol.

Figure 4:
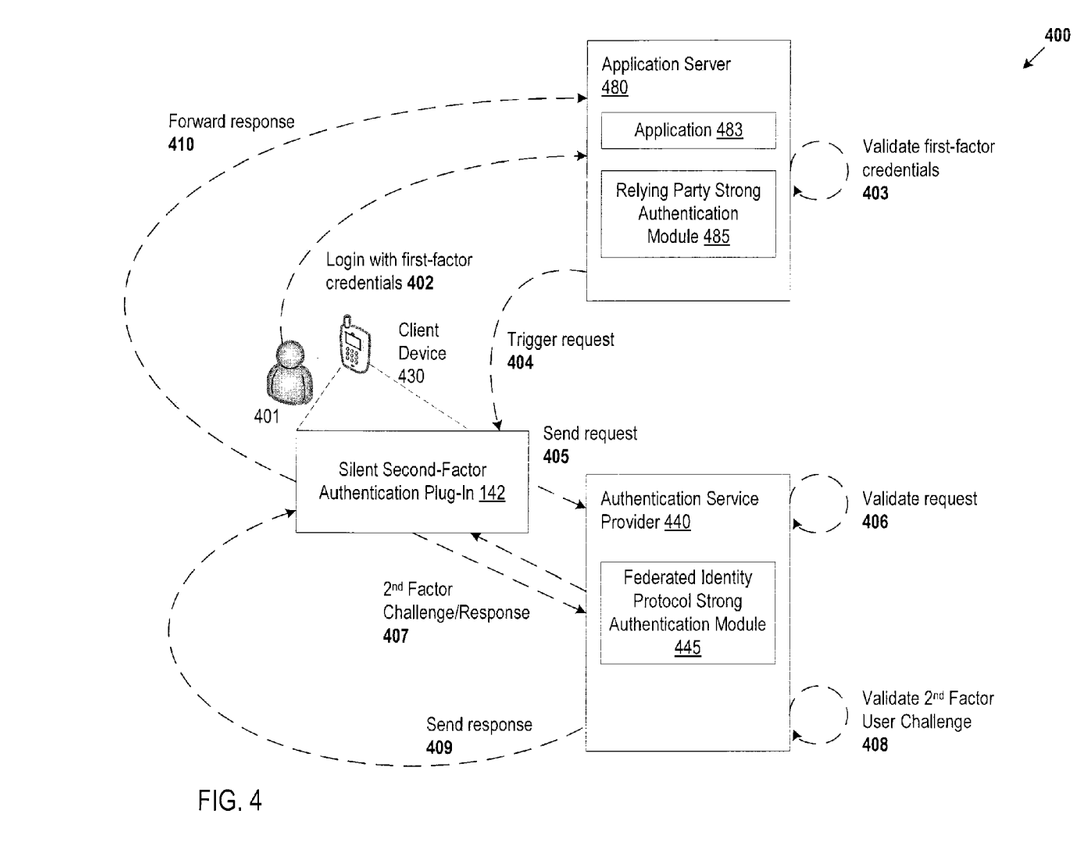
FIG. 4 is a block diagram of an exemplary flow for providing strong authentication via a federated identity protocol.

FIG. 4 is a block diagram of an exemplary flow for providing strong authentication via a federated identity protocol. A user 401 attempts to login 402 to an application 483 with a user ID and password, and the application server 480 successfully validates 403 the user ID and password. The relying party strong authentication module 485 sends validation results to the silent second-factor authentication module which triggers 404 the silent second-factor authentication plug-in to send a request 405 to the authentication service provider 440 to validate the user 401 and/or client device 430 using strong authentication.

The request can be a modified federated identity protocol request to redirect the client device 430 to the authentication service provider 440 via a SAML redirect command. The federated identity protocol request includes a user identifier and one or more attributes, such as a second-factor authentication attribute that identifies the type of second-factor authentication challenge the authentication service provider 440 should use or a specific second-factor authentication challenge the authentication service provider 440 should use. For example, the request includes a second-factor attribute TKI_UID1'.

The federated identity protocol strong authentication module 445 receives the SAML redirect and uses business rules and user data that are associated with the enterprise application to validate 406 that the request is a legitimate request. The business rules can describe policies for different types of enterprise users and different policies for the various types of second-factor challenges (e.g., requests for virtual tokens, OTP, physical tokens, fingerprints, etc.). For example, there may be a PayPal® business rule that allows up to five second-factor challenges to be associated with any PayPal® user that is a Premium level user and up to two second-factor challenges for any PayPal® user that is a Basic level user. There may be a PayPal® business rule that limits Basic level users to one type of second-factor challenge, such as OTP. There may be a PayPal® business rule that permits any Premium level user to use any type of virtual token for silent second-factor authentication, which does not require any user input from the Premium level users. According to the PayPal® policies, if the request from the relying party includes a user identifier for a Basic Level user, the request should also include an attribute of 'OTP' in order for the request to be a legitimate request.

If the request is valid, the federated identity protocol strong authentication module 445 accesses user data to locate a second-factor challenge to send to the client device 430. For example, the federated identity protocol strong authentication module 445 sends 407 a query for a type of virtual token (e.g., PKI certificate) to the client device 430 and receives 405 a response from the client device 430. The response may include a virtual token (e.g., PKI certificate) that is stored on the client device 430. The federated identity protocol strong authentication module 445 validates 408 the second-factor challenge response received for the client device 430 using the user data store in a data store and generates and sends 409 a response to the silent second-factor authentication plug-in 142 via the federated identity protocol, which can forward 410 the response to the application server 480. The response indicates whether the second-factor response from the user was successfully validated, and the application server 180 determines whether to grant the user 401 access to the application 483 based on the response.

Figure 5:
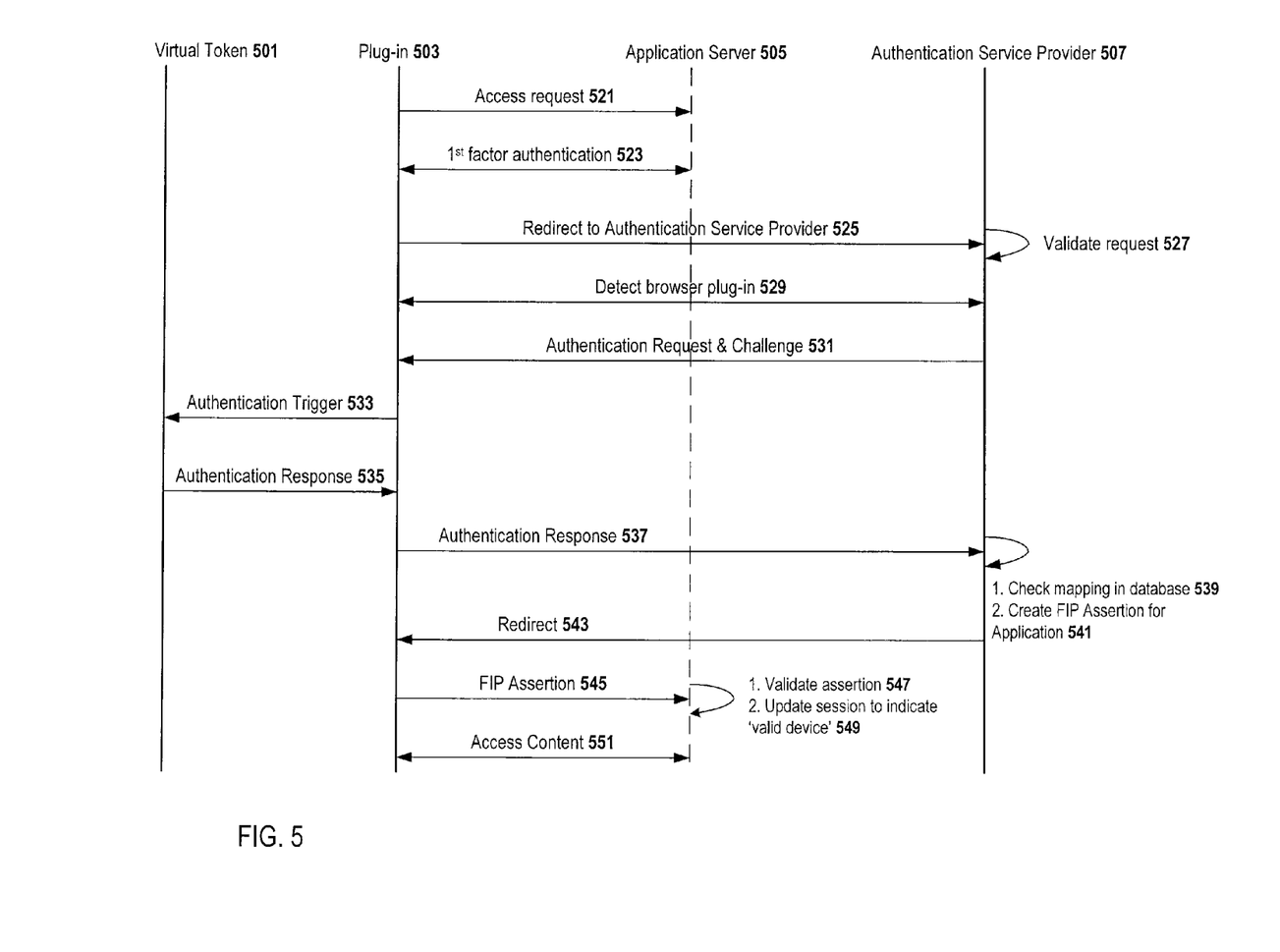
FIG. 5 is a block diagram of an exemplary flow for providing silent second-factor authentication via a federated identity protocol.

FIG. 5 is a block diagram of an exemplary flow of one embodiment for providing silent second-factor authentication of a user device and/or a user using a second-factor virtual token via a federated identity protocol. A user registers a virtual token with a user device using an authentication service provider. The registration process installs a silent second-factor authentication plug-in 503 and a virtual token 501 on the user device. The virtual token 501 can be a PKI certificate. The plug-in 501 can be a browser plug-in. For example, a PayPal® Premium level user, Jane Doe, communicates with an authentication service provider to register a virtual token 501 for her smart phone for access to her PayPal® Premium level account.

Jane Doe wishes to login to her PayPal® account using her smart phone. The plug-in 503 on her smart phone sends an access request 521 that includes her first-factor user credentials (e.g., user ID and password) to the application server 505, which hosts the PayPal® application. The application server 505 validates Jane Doe's identity by comparing her first-factor user credentials against the first-factor user credentials stored in a data store that is coupled to the application server 505 and sends 523 a success response to the plug-in 503.

The success response triggers the plug-in 503 to be redirected 525 to the authentication service provider 507 using standard federated identity request protocol (e.g., SAML, OpenID). For example, the redirect 525 can use either HTTP GET or POST and a <sampl:AuthnRequest>element. The redirect 525 is a request that the authentication service provider 507 validate the user and/or user device (e.g., Jane Doe and her smart phone) using strong authentication. The redirect 525 can include an enterprise identifier for PayPal®, a user identifier for Jane Doe, and a second-factor TKI_UID1'. Another example of an attribute can include, and is not limited to, a device identifier. In one embodiment, the redirect 525 includes a specific instruction on the desired authentication to be used. For example, the redirect 525 may include a message "Please authentication this user and require a One Time Password or PKI credential." In another embodiment, the redirect 525 does not include explicit instructions and the authentication service provider 507 can determine which application server 505 is associated with the request and use configuration data to determine which authentication method and/or business logic is to be used for the particular application server 505. The authentication service provider 507 can be coupled to a data store that stores backend configuration data that specifies which authentication method or business logic should be used for a particular application server. The configuration data can be pre-configured.

The authentication service provider 507 uses business rules and user data that are associated with the enterprise application to validate 527 that the request (e.g., redirect 525) is a legitimate request. For example, there may be a PayPal® business rule that permits any Premium level user to use any type of virtual token for silent second-factor authentication. According to the PayPal® policies, if the request includes a second-factor attribute for a virtual token, then the user identifier in the request should correspond to a Premium level user in order for the request to be a legitimate request. The authentication service provider 507 can search user data using the user identifier for Jane Doe in the request and determine that Jane Doe is a Premium level user. Finding the request is a legitimate request, the authentication service provider 507 detects 529 the plug-in 503 installed on the smart phone.

The authentication service provider 507 accesses user data to locate a second-factor challenge (e.g., request for the second-factor credential) to send to the smart phone and sends the challenge 531 to the plug-in 503 on the smart phone. For example, the authentication service provider 507 sends a query for a virtual token (e.g., PKI certificate) to the plug-in 503.

The request for the virtual token is handled by the plug-in 503 and is not visible to a browser that is hosted by the smart phone. The plug-in 503 triggers a search 533 for the virtual token (e.g., PKI certificate) on the smart phone. The virtual token 535 is not visible to a browser that is hosted by the smart phone and thus, the search is conducted by the plug-in 503. The plug-in 503 locates 535 a virtual token on the smart phone. The plug-in 503 generates a second-factor challenge response, which includes the virtual token, and sends 537 the response to the authentication service provider 507.

The authentication service provider 507 validates the user device by comparing 539 the second-factor challenge response to mapping data. The authentication service provider 507 also verifies that the user device is registered for the specific user by verifying the mapping. The authentication service provider 507 creates 541 a validation response based on the comparison to the mapping data. The validation response indicates whether the user device and/or user were successfully validated. The validation response can be a federated identity protocol assertion (e.g., SAML assertion).

The authentication service provider 507 sends the response as part of a redirect 543 to the plug-in 503. The redirect 543 includes the assertion. The plug-in 503 sends 545 the assertion (e.g., SAML assertion) in the response to the application server 505 via the federated identity protocol. The application server 505 validates 547 the assertion by validating the signature of the assertion using the public key of the authentication service provider 507. The application server 505 updates 549 the session data to indicate the device is valid and grants the user access to the application.

In one embodiment, the machine (e.g., user device) that is used to access an application server 505 also hosts the second-factor credential (e.g., virtual token 501). In another embodiment, the second-factor credential could be hosted by a different machine (e.g., a different user device) and the authentication service provider 507 sends the authentication request and challenge 531 to the different device that is hosting the second-factor credential, and the different device searches 533 for the virtual token (e.g., PKI certificate). The different device locates 535 a virtual token and generates a second-factor challenge response, which includes the virtual token, and sends 537 the response to the authentication service provider 507. In this embodiment, paths 531 and 533 collapse to a single path from the authentication service provider 507 to the device that is hosting the second-factor credential, and paths 535 and 537 collapse to a single path from the device that is hosting the second-factor credential to the authentication service provider 507.

Figure 6:
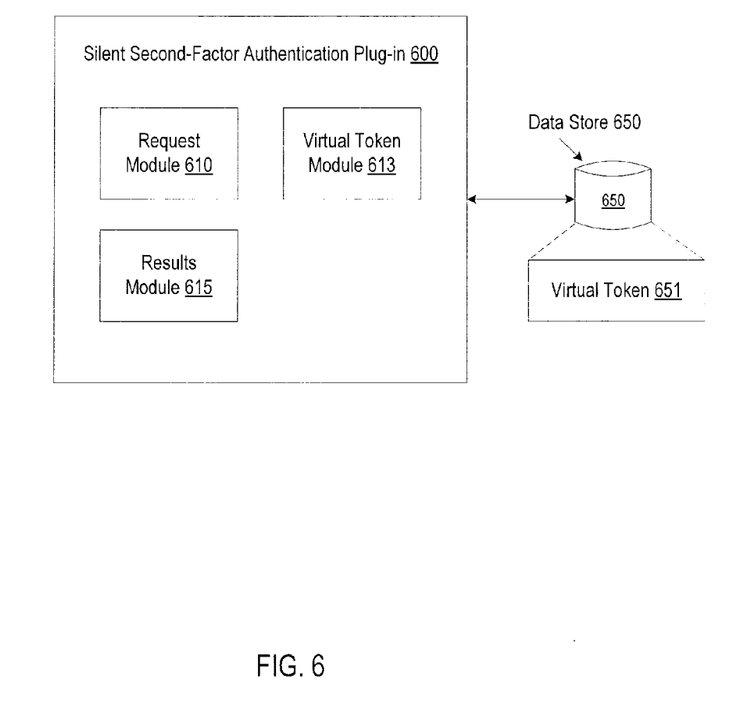

FIG. 6 is a block diagram of one embodiment of a silent second-factor authentication plug-in 600. The silent second-factor authentication plug-in 600 may be the same as the silent second-factor authentication plug-in 142 of FIGS. 1A-B. The silent second-factor authentication plug-in 600 includes a request module 610, a virtual token module 613, and a results module 615. The modules can be combined together or separated in further sub-modules, according to a particular embodiment.

The request module 610 can receive first-factor validation results indicating that a user identity of a user has been successfully authenticated via first-factor credentials (e.g., username and password). The validation results can include a user identifier, such as a first-factor credential (e.g., username). The validation results can be received from an identity service provider or an application server. The request module 610 can create a modified federated identity protocol request for an authentication service provider to validate the user and/or user device using second-factor authentication. The request includes a user identifier of the user identity that has been authenticated and one or more attributes, such as a second-factor attribute that identifies the type of second-factor authentication challenge which the authentication service provider should use or a specific second-factor authentication challenge that should be used. Backend configuration data can be pre-configured to specify which authentication method or business logic should be used. In one embodiment, the request module 610 creates a user identifier that does not reveal a first-factor credential of the user. The user identifier can be a unique handle, such as a hash of a first-factor credential. The request module 610 can send the modified federated identity protocol request to the authentication service provider via a federated identity protocol.

The virtual token module 613 can receive a virtual token request from the authentication service provider for a type of virtual token, such as a specific PKI certificate. The virtual token module 613 can search a data store 650 that is coupled to the silent second-factor authentication plug-in 600 for a virtual token. A virtual token 651 can be stored in the data store 650 when a user registers the user device with an authentication service provider. The virtual token 651 stored in the data store 650 is not visible to a browser hosted by the user device. The virtual token module 613 can provide the virtual token 651 to the authentication service provider.

The results module 615 can receive second-factor authentication results from the authentication service provider via a federated identity protocol and can send the results to a relying party via the federated identity protocol.

Figure 7:
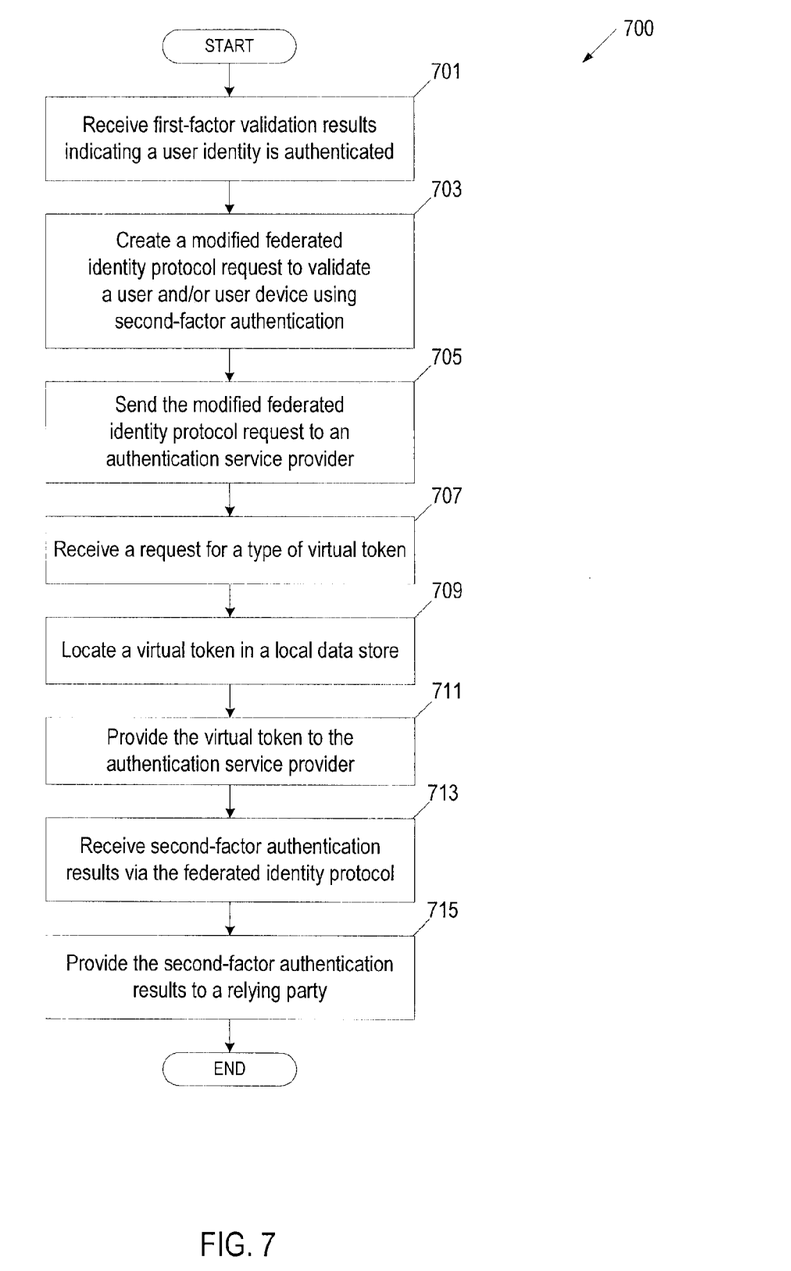
FIG. 7 is a flow diagram of an embodiment of a method for providing silent strong authentication services via a federated identity protocol.

FIG. 7 is a flow diagram of an embodiment of a method 700 for providing silent strong authentication services via a federated identity protocol. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by a silent second-factor authentication plug-in 142 of FIGS. 1A-B.

At block 701, processing logic receives first-factor validation results indicating that a user identity of a user is authenticated. The validation results can include a user identifier, such as a first-factor credential (e.g., username). At block 703, processing logic creates a modified federated identity protocol request, which includes a user identifier of the user identity that has been authenticated. The modified federated identity protocol request can also include an enterprise identifier. The request is a request for an authentication service provider to validate the user and/or user device using second-factor authentication. In one embodiment, the user identifier that is included in the request does not reveal a first-factor credential of the user. The user identifier can be a unique handle, such as a hash of a first-factor credential.

At block 705, processing logic sends the modified federated identity protocol request to the authentication service provider via a federated identity protocol. At block 707, processing logic receives a virtual token request from the authentication service provider. The request is for a type of virtual token, such as a specific PKI certificate. At block 709, processing logic locates a virtual token from a local data store and provides the virtual token to the authentication service provider at block 711. The virtual token stored in the local data store is not visible to a browser hosted by the user device. The authentication service provider receives the virtual token and verifies it using mapping data and generates second-factor authentication results. At block 713, processing logic receives the second-factor authentication results from the authentication service provider via a federated identity protocol and sends the results to a relying party via the federated identity protocol at block 715. The relying party may be an application server or an identity service provider. The second-factor authentication results can be used by an application server to determine whether to grant a user access to an application.

Figure 8:
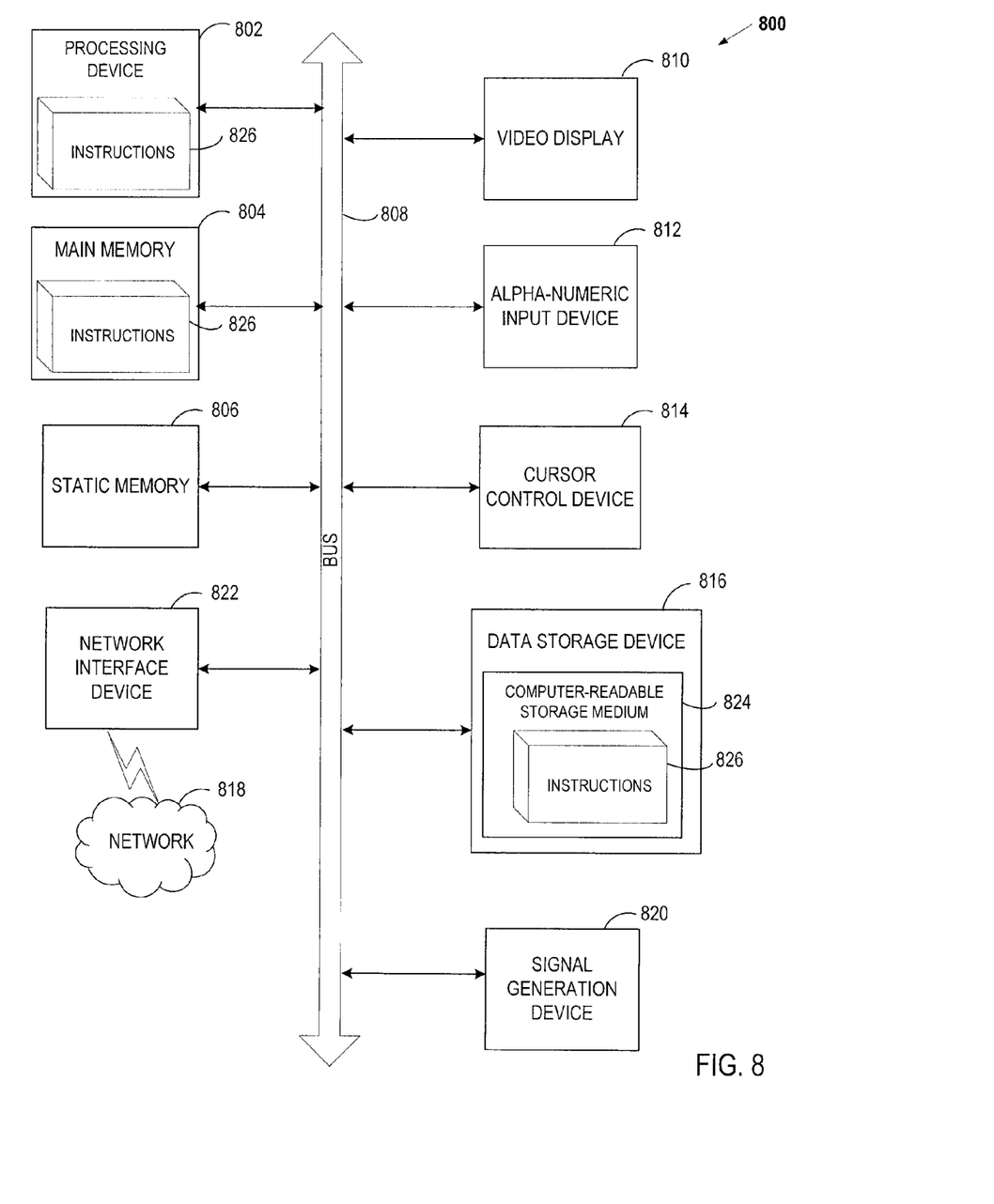
FIG. 8 is a diagram of one embodiment of a computer system that may perform one or more of the operations described herein.

FIG. 8 is a diagram of one embodiment of a computer system for providing strong authentication via a federated identity protocol. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media. The instructions 826 may further be transmitted or received over a network 818 via the network interface device 822.

The computer-readable storage medium 824 may also be used to store the instructions 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 826, components and other features described herein (for example in relation to FIG. 2 and FIG. 6) can be implemented as discrete hardware components or integrated in the functionality of hardware components such as ASICS, FPGAs, DSPs or similar devices. In addition, the instructions 826 can be implemented as firmware or functional circuitry within hardware devices. Further, the instructions 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "searching," "authenticating," "sending," "requesting," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for providing strong authentication via a federated identity protocol is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a computing system of an authentication service provider and from a user device associated with a user, a federated identity protocol request to validate the user using second-factor authentication, wherein the federated identity protocol request corresponds to validation results received by the user device, the validation results indicative of a first-factor authentication of the user at an application server with respect to a user access attempt regarding an application hosted by the application server;
determining a user identifier associated with the user in the federated identity protocol request;
searching mapping data stored in a data store that is coupled to the computing system to identify a type of virtual token that corresponds to the user identifier in the federated identity protocol request;
authenticating the user, at the authentication service provider, based on second-factor authentication by requesting the identified type of virtual token from a user device without notifying the user, receiving a virtual token from the user device without receiving user input, and verifying the virtual token received from the user device using the mapping data; and
sending second-factor authentication results to the application server via the federated identity protocol.

2. The method of claim 1, wherein requesting the identified type of virtual token without notifying the user comprises:
sending a request for the identified type of virtual token to a plug-in hosted by the user device, the plug-in to obtain the virtual token hosted by the user device in response to the request.

3. The method of claim 1, wherein the identified type of virtual token is a public key infrastructure certificate.

4. The method of claim 1, wherein the federated identity protocol is Security Assertion Markup Language.

5. An apparatus comprising:
a memory;
a local data store to store a virtual token; and
a processing device coupled to the memory and the local data store to:
receive, by a user device from an application server hosting an application, first-factor validation results of first-factor authentication of user credentials in response to a user attempt to access the application;
create, in response to receiving the first-first factor validation results, a federated identity protocol request comprising a user identifier associated with the user;
send the federated identity protocol request to an authentication service provider to validate the user using second-factor authentication, the federated identity protocol request comprising the user identifier;
receive a request for a type of a virtual token from the authentication service provider without notifying the user;
provide, without receiving user input, the virtual token from the local data store to the authentication service provider, wherein the authentication service provider generates second-factor authentication results indicating whether the provided virtual token is valid; and
provide the second-factor authentication results for the application server.

6. The apparatus of claim 5, wherein the processing device is further to:
execute a plug-in to receive the request from the authentication service provider and locate the virtual token in the local data store.

7. The apparatus of claim 5, wherein the user identifier does not reveal a first-factor credential of the user.

8. A system comprising:
a first memory; and
a first processing device coupled with the memory to:
receive, by the first processing device of an authentication service provider and from a user device associated with a user, a federated identity protocol request to validate the user using second-factor authentication, wherein the federated identity protocol request corresponds to validation results received by the user device, the validation results indicative of a first-factor authentication of the user at an application server with respect to a user access attempt regarding an application hosted by the application server;
determine a user identifier associated with the user;
search mapping data stored in a data store that is coupled to the first processing device to identify a type of virtual token that corresponds to the user identifier in the federated identity protocol request;
authenticate the user, at the authentication service provider, based on second-factor authentication by requesting the identified type of virtual token from the user device without notifying the user, receiving a virtual token from the user device without receiving user input, and verifying the virtual token received from the user device using the mapping data; and
send second-factor authentication results to the application server via the federated identity protocol.

9. The system of claim 8, wherein the first processing device is to request the identified type of virtual token without notifying the user by:

sending a request for the identified type of virtual token to a plug-in hosted by the user device, the plug-in to obtain the virtual token hosted by the user device in response to the request.

10. The system of claim 8, wherein the identified type of virtual token is a public key infrastructure certificate.

11. The system of claim 8, wherein the federated identity protocol is Security Assertion Markup Language.

12. The system of claim 8, further comprising:
a second memory;
a second local data store to store a virtual token; and
a second processing device coupled with the second memory and the second local data store to:
receive, from the application server executing on the first processing device and hosting the application, the validation results of the user is authenticated using first factor authentication of the first-factor authentication of the user in response to the user access attempt regarding the application;
create, in response to receiving the validation results of the first factor authentication, the federated identity protocol request comprising the user identifier associated with the user;
send the federated identity protocol request to the authentication service provider to validate the user using second-factor authentication, the federated identity protocol request comprising the user identifier;
receive a request for a type of a virtual token from the authentication service provider;
provide the virtual token from the second local data store to the authentication service provider, wherein the authentication service provider generates second-factor authentication results indicating whether the provided virtual token is valid; and
provide the second-factor authentication results to be received by the application server.

13. The system of claim 12, further comprising:
a plug-in executed by the second processing device to receive the request from the authentication service provider and locate the virtual token in the second local data store.

14. The system of claim 12, wherein the user identifier does not reveal a first-factor credential of the user.

15. A non-transitory computer readable storage medium including instructions that, when executed by a first processing device, cause the first processing device to perform operations comprising:
receiving, by the first processing device of an authentication service provider and from a user device associated with a user, a federated identity protocol request to validate the user using second-factor authentication, wherein the federated identity protocol request corresponds to validation results received by the user device, the validation results indicative of a first-factor authentication of the user at an application server with respect to a user access attempt regarding an application hosted by the application server;
determining a user identifier associated with the user in the federated identity protocol request;
searching mapping data stored in a data store that is coupled to the first processing device to identify a type of virtual token that corresponds to the user identifier in the federated identity protocol request;
authenticating the user, at the authentication service provider, based on second-factor authentication by requesting the identified type of virtual token from a user device without notifying the user, receiving a virtual token from the user device without receiving user input, and verifying the virtual token received from the user device using the mapping data; and
sending second-factor authentication results to the application server via the federated identity protocol.

16. The non-transitory computer readable storage medium of claim 15, wherein the federated identity protocol is Security Assertion Markup Language.

17. The non-transitory computer readable storage medium of claim 15, wherein the instructions, when executed by a second processing device, cause the second processing device to perform operations comprising:
receiving, from the application server, the validation results indicative of the first-factor authentication of the user at the application server with respect to the user access attempt regarding an application hosted by the application server;
creating, in response to receiving the validation results, a federated identity protocol request comprising a user identifier associated with the user;
sending the federated identity protocol request to an authentication service provider to validate the user using second-factor authentication, the federated identity protocol request comprising the user identifier;
receiving a request for a type of a virtual token from the authentication service provider;
providing the virtual token from a local data store to the authentication service provider, wherein the authentication service provider generates second-factor authentication results indicating whether the provided virtual token is valid; and
providing the second-factor authentication results for the application server.

* * * * *